June 30, 1936.                G. B. WATKINS                2,046,047
APPARATUS FOR THE MANUFACTURE OF SAFETY GLASS
Filed Sept. 15, 1932        2 Sheets-Sheet 2
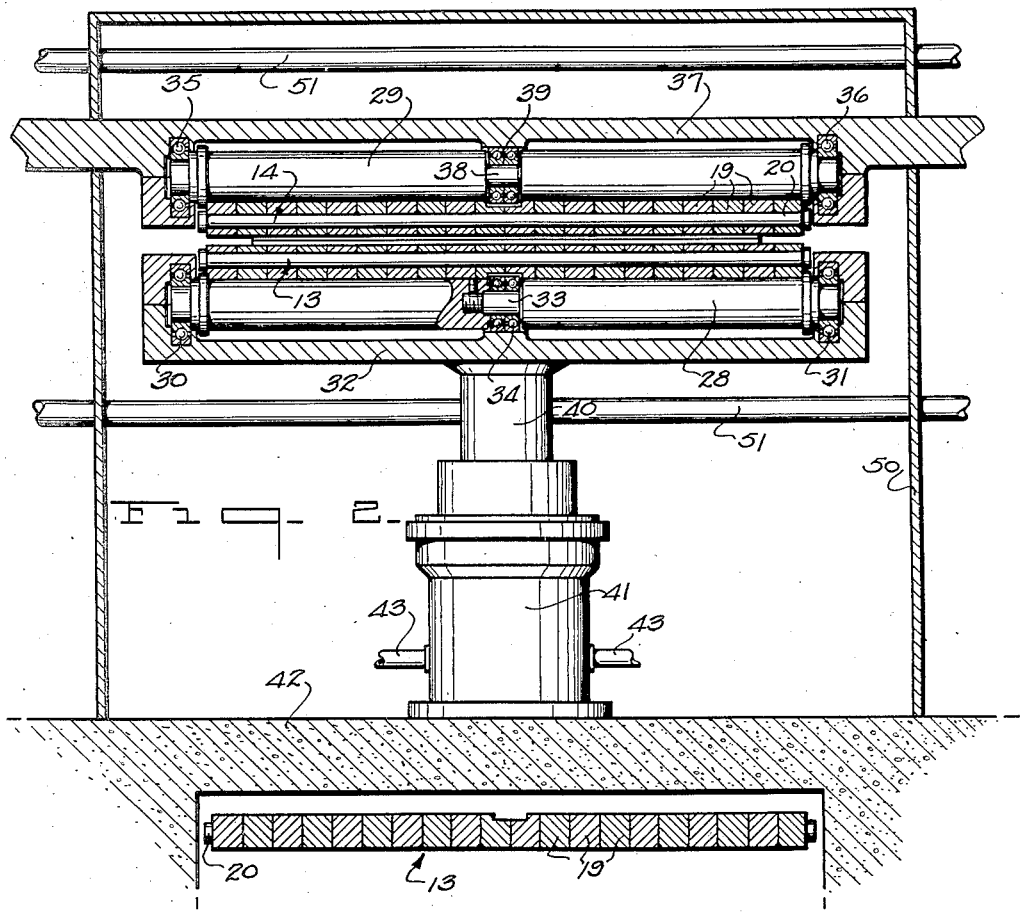
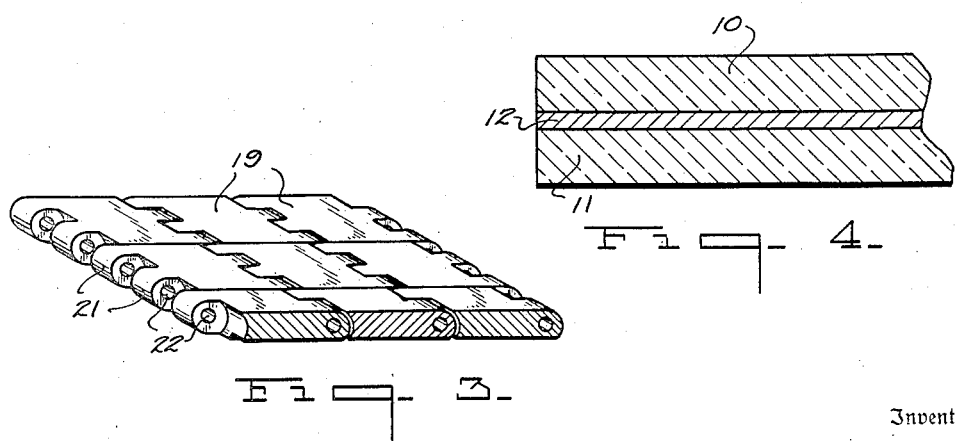
Inventor
GEORGE B. WATKINS.
By Frank Fraser
Attorney Patented June 30, 1936

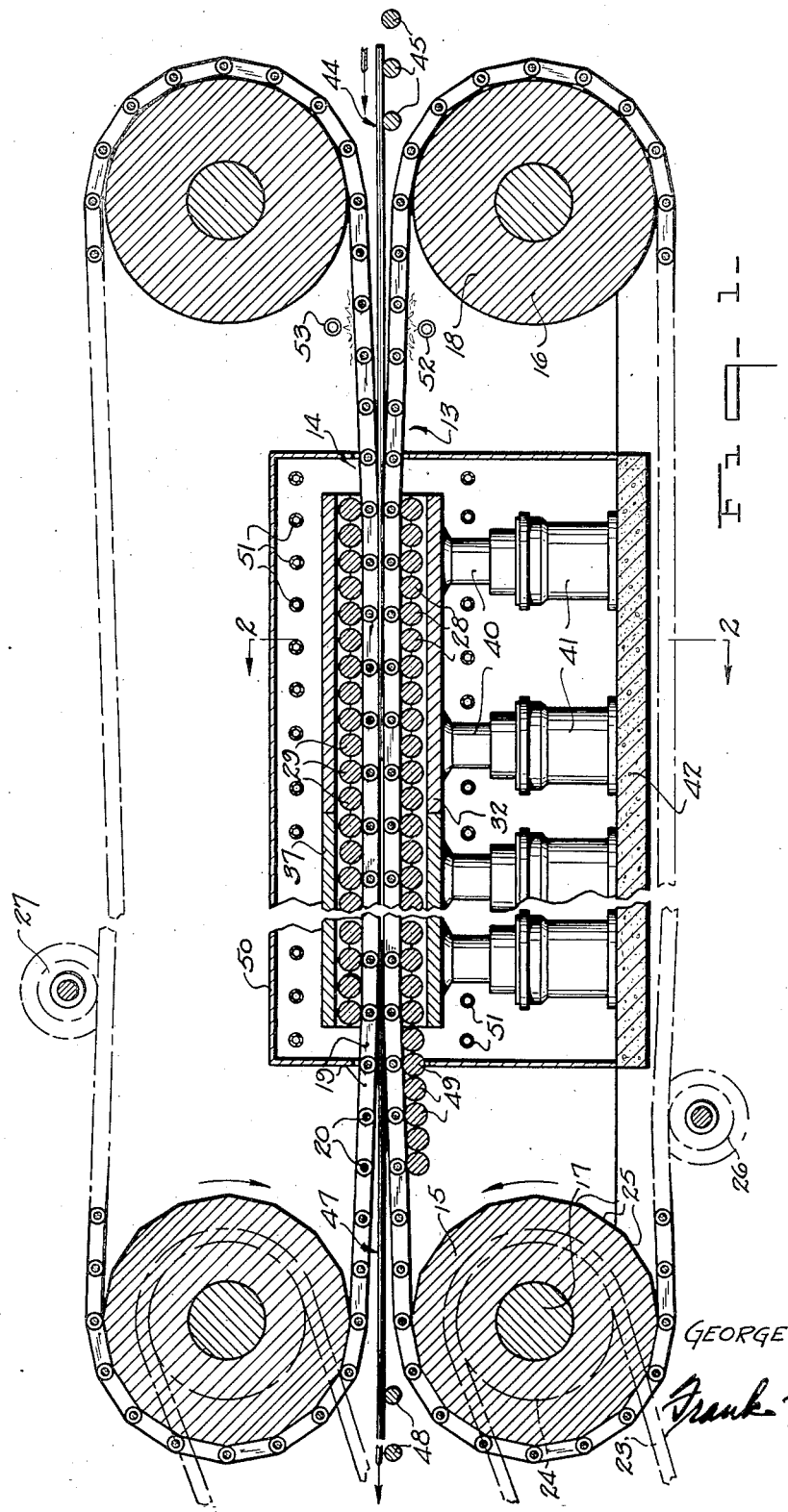

2,046,047

UNITED STATES PATENT OFFICE 2,046,047

APPARATUS FOR THE MANUFACTURE OF SAFETY GLASS

George B. Watkins, Toledo, Ohio, assignor to Libbey-Owens-Ford Glass Company, Toledo, Ohio, a corporation of Ohio Application September 15, 1932, Serial No. 633,296

1 Claim. (Cl. 18—17)

The present invention relates to improvements in apparatus for use in the production of laminated or safety glass and which glass usually consists of two or more sheets of glass and one or more non-brittle membranes interposed therebetween and bonded thereto to provide a composite structure.

According to one process for producing laminated glass, the glass sheets and non-brittle membrane or membranes are first treated in the desired manner with a bonding or bond-inducing medium and then assembled in proper superimposed relationship to form a "sandwich". The said sandwich is then submerged unprotected within a bath of fluid contained in an autoclave and there subjected to the combined action of heat and pressure, the said fluid coming into direct contact with the sandwich so as to effect a uniform application of heat and pressure throughout from all sides thereof whereby to cause a bonding together of the several laminations to produce a composite structure. In such process, however, it has been found desirable that the sandwich, before being placed within the fluid bath, be subjected at least to a relatively light initial or preliminary pressing sufficient to expel any air, excess bonding medium, if any, non-condensible gases, etc. from between the several laminations and to cause said laminations to stick together to prevent the pressing fluid from creeping in between the laminations when said sandwich is placed within the autoclave.

The aim and principal object of the present invention, therefore, lies in the provision of novel apparatus for treating the sandwich in a manner to effect the desired initial or preliminary pressing thereof prior to its being placed within the autoclave wherein it may be subjected to finishing temperatures and pressures.

Another important object of the invention is the provision of such an apparatus of a simplified construction and operation whereby the initial or preliminary pressing of the several laminations may be accomplished rapidly and conveniently and in a substantially continuous manner to the end that the labor involved in such operation will be less and the time required in the performance thereof reduced.

A further object of the invention is to provide an apparatus of the above character embodying a pair of endless traveling platens adapted to receive the several laminations to be joined therebetween, said platens serving to carry the said laminations forwardly and, at the same time, to apply sufficient pressure thereto to press the adjacent surfaces of the said laminations into fairly intimate contact with one another.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longtiudinal section through apparatus constructed in accordance with the present invention, Fig. 2 is a vertical section taken substantially on line 2—2 of Fig. 1.

Fig. 3 is a perspective sectional view of a portion of one of the endless platens, and Fig. 4 is a fragmentary sectional view of a portion of a sheet of laminated or safety glass.

Referring now to the drawings and particularly with reference first to Fig. 4, there is illustrated a sheet of laminated or safety glass comprising the two sheets of glass 10 and 11 between which is interposed a sheet or layer of non-brittle material 12 bonded to the glass sheets to provide a composite structure. It is quite customary in the commercial production of laminated glass to use a pyroxylin plastic for the non-brittle sheet or membrane. In some processes, the glass sheets are provided with skin coats of gelatine or nitrocellulose compounds while in others no such skin coats are employed but instead a suitable bonding or bond-inducing medium is applied directly to the non-brittle membrane. However, there are also other processes, and it is therefore to be understood that the present invention is not limited to any particular process or ingredients used in the manufacture of the composite sheet. On the contrary, this invention concerns particularly the handling of the laminations after they have been treated in the desired manner with a suitable adhesive or other bonding agent and arranged in proper assembled relationship to form a sandwich.

In accordance with the present invention, the means provided for effecting the preliminary or initial pressing of the several laminations prior to the placing thereof within the autoclave includes a pair of horizontal superimposed endless platens 13 and 14 respectively between which the assembled laminations are adapted to be carried and subjected to sufficient pressure to effect the joining thereof. Each platen 13 and 14 is in the form of a link belt trained at the opposite ends of its loop about drums 15 and 16 mounted upon shafts 17 and 18 respectively. Each platen is composed of a plurality of rows of overlapping and interlocking links 19 pivotally associated with one another to provide an endless belt formation. The links are pivotally connected together by means of transverse rods 20 and are so shaped that the platen will present a substantially flat unbroken surface when disposed in its work engaging run. As best shown in Fig. 3, each link 19 may comprise a body portion having at each end thereof a pair of spaced ears 21, with the ears of one link being received within the spaces between the ears on the adjacent links, the rods 20 passing through the transverse openings 22 in the overlapping ears of adjacent links to connect the rows of links together.

One of the supporting drums 15 or 16 of each endless platen 13 and 14 and, as here shown drum 15, is adapted to be positively driven in any desired manner to drive the respective endless platen. The rotation of the drum may be effected by means of a sprocket and chain drive including a sprocket chain 23 trained about a sprocket 24 keyed to shaft 17. This drum is not truly cylindrical, but instead is provided with a plurality of flat sides or faces 25, the width of each flat face of the drum being substantially the same as the space between the pivot points of adjacent links.

A roller 26 may be provided to engage the lower horizontal run of the endless platen 13, while a similar roll 27 may be provided to engage the upper horizontal run of the endless platen 14 whereby to maintain the said platens taut.

Arranged within the loop of the endless platen 13 and adapted to support the same in its upper horizontal run are a series of transversely extending horizontally aligned rolls 28. Also arranged within the loop of the endless platen 14, in opposition to the rolls 28, and adapted to engage the lower horizontal run of said platen is a series of similar horizontally aligned rolls 29. The rolls 28 are journaled at their opposite ends in roller bearings 30 and 31 carried at the opposite sides of a substantially U-shaped supporting member 32, said rolls being reduced in diameter at their centers as at 33 and rotatably supported by roller bearings 34. The upper rolls 29 are likewise journaled at their opposite ends in roller bearings 35 and 36 carried by the upper horizontal supporting member 37, said rolls also being of a smaller diameter at their centers as indicated at 38 and supported by the roller bearings 39. As a matter of fact, each of the rolls 28 and 29 may consist of two sections arranged end to end and connected together by a pin or bolt of a relatively smaller diameter. It is desirable that the rolls 28 and 29 be supported intermediate their ends as well as at their opposite ends in order to prevent deflection of the said rolls during the pressing operation.

The upper rolls 29 are mounted in a relatively fixed position in that they are not movable vertically. On the other hand, the lower rolls 28 are movable bodily vertically toward and away from the upper rolls 29 to control the amount of pressure exerted by the endless platens 13 and 14 upon the assembled laminations to be joined. To provide for this vertical adjustment of the lower rolls 28, the supporting member 32 may be carried at the upper ends of a plurality of vertical plungers 40, each being slidable within a cylinder 41 supported upon the foundation 42. The plungers 40 may be actuated by either pneumatic or hydraulic means, and to this end, each cylinder 41 is provided with a plurality of connections 43 to permit of the entrance of the air or fluid into said cylinder and its discharge therefrom. The supporting member 32 is preferably divided into a plurality of sections arranged end to end, with each section being supported upon a pair of plungers 40.

In the operation of the present invention, the glass sheets and sheet of non-brittle material to be joined are first treated in the desired manner with a suitable bonding agent or bond-inducing medium, adhesive or the like, and then assembled in proper superimposed relationship to form a sandwich 44. This sandwich is then placed horizontally upon a plurality of rollers 45 and passed in the direction indicated by the arrow in Fig. 1 between the endless platens 13 and 14 which are of course being positively driven in a manner to carry the sandwich forwardly therebetween. Prior to the feeding of the sandwich between the platens, however, the lower rolls 28 are adjusted vertically so that the desired pressure will be applied to the sandwich by said platens as said sandwich is carried therebetween. As the glass sheets and sheet of non-brittle material are carried forwardly by and between the endless platens, they will be subjected to sufficient pressure to bring the surfaces of the adjacent laminations into more or less intimate contact with one another throughout substantially their entire areas, whereupon the sandwich can be placed unprotected within an autoclave and subjected to the direct action of fluid under pressure. In other words, the several laminations will be united by pressure uniformly applied to successive portions thereof. The two series of rolls 28 and 29 serve to maintain the endless platens in engagement with the sandwich and also control the amount of pressure exerted by the said platens thereupon. Due to the fact that the endless platens 13 and 14 and rolls 28 and 29 extend the entire width of the glass sheets assures an even and uniform application of pressure thereto throughout the entire width thereof. The glass sheets and non-brittle material, after being united to form a composite structure 47, are delivered from between the endless platens onto a plurality of conveyor rolls 48. If desired, additional rolls 49 may be provided to support the upper run of the lower endless platen 13 as it emerges from between the upper and lower series of rolls 28 and 29.

From the above, it will be seen that there has been provided a novel form of apparatus whereby the several laminations may be joined together in a substantially continuous manner and while being carried forwardly by and between the endless platens 13 and 14. The pressing operation therefore may be accomplished rapidly and conveniently with the expenditure of less labor and in a relatively shorter time than heretofore required. If the laminations were not in intimate contact before their introduction into the autoclave, and without the use of protecting means for the sandwich, it would be impossible to get the intimate contact between the surfaces in the autoclave and furthermore, the pressing fluid would creep in between the laminations, making it impossible to properly join them. However, these objectionable features are readily avoided by subjecting the sandwich to a preliminary or initial pressing as set forth hereinabove. It will, of course, be understood that the expression "intimate contact" is relative and does not necessarily infer absolute contact, although the endless platens 13 and 14 may, under certain conditions, be utilized to apply the finishing pressure to the sandwich.

The rolls 28 and 29, together with those portions of the endless platens 13 and 14 passing therebetween, are preferably enclosed in a suitable housing 50 to assure the necessary heat which is desired during the pressing operation. The housing 50 may be heated in any suitable manner such as by means of a plurality of steam pipes 51 passing transversely therethrough above and beneath the path of travel of the work. Also, if desired, the endless platens 13 and 14 may be heated before passing into the chamber 50 by means of burners or the like 52 and 53 respectively.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

In apparatus for use in the production of laminated glass, means for effecting the successive pressing of individual sets of assembled sheets to be joined, embodying a horizontally disposed endless conveyor for supporting and carrying the sets of sheets continuously forwardly, a second horizontal endless conveyor arranged in superimposed relation with respect to said first conveyor and cooperating therewith to press the sheets together to unite the same during the forward movement thereof, a series of horizontally aligned stationary rotatable rolls arranged beneath and engaging the upper horizontal run of the first mentioned conveyor, a second series of horizontally aligned stationary rotatable rolls positioned above and engaging the lower horizontal run of said second mentioned conveyor, and means for moving the first mentioned series of rolls toward and away from the second named series of rolls including a member for supporting said first series of rolls, a plurality of vertical plungers carrying said supporting member at their upper ends and a cylinder for slidably receiving each plunger therein, said cylinders being provided with connections for the entrance of air or fluid thereto and its discharge therefrom.

GEORGE B. WATKINS.